United States Patent [19]
Thary

[11] Patent Number: 5,641,564
[45] Date of Patent: Jun. 24, 1997

[54] THREE-DIMENSIONALLY FORMED LAMINATE

[75] Inventor: Christian Thary, Farmington Hills, Mich.

[73] Assignee: Namba Corporation, Walled Lake, Mich.

[21] Appl. No.: 416,091

[22] Filed: Apr. 4, 1995

Related U.S. Application Data

[60] Continuation of Ser. No. 134,278, Oct. 12, 1993, abandoned, which is a division of Ser. No. 890,530, May 28, 1992, Pat. No. 5,296,182.

[51] Int. Cl.$^6$ ............................................. B32B 3/26
[52] U.S. Cl. ........................ 428/314.2; 428/304.4; 428/314.4; 428/423.1; 428/318.4; 442/30
[58] Field of Search ................................ 428/266, 284, 428/304.4, 314.2, 314.4, 423.1, 318.4; 264/46.5, 46.6, 257.321

[56] References Cited

U.S. PATENT DOCUMENTS

| | | | |
|---|---|---|---|
| 3,028,284 | 4/1962 | Reeves | 264/257 |
| 3,058,161 | 10/1962 | Beyer et al. | 137/53 |
| 3,243,485 | 3/1966 | Griffin | 264/51 |
| 3,506,600 | 4/1970 | Zocco et al. | 521/128 |
| 3,608,092 | 9/1971 | Taranto | 2/49.1 |
| 3,622,435 | 11/1971 | Cacella | 428/288 |
| 3,648,692 | 3/1972 | Wheeler | 128/156 |
| 3,650,993 | 3/1972 | Zocco et al. | 524/131 |
| 3,709,966 | 1/1973 | Gambardella | 264/46.4 |
| 3,718,417 | 2/1973 | Bethe . | |
| 3,867,320 | 2/1975 | Gambardella et al. | 521/174 |
| 3,880,977 | 4/1975 | Gealer et al. | 264/321 |
| 3,919,451 | 11/1975 | Levy et al. | 428/310 |
| 3,929,948 | 12/1975 | Welch et al. | 264/45.5 |
| 3,978,266 | 8/1976 | Lock | 428/314.2 |
| 3,978,855 | 9/1976 | McRae et al. | 602/46 |
| 3,979,538 | 9/1976 | Gilman et al. | 428/90 |
| 3,989,781 | 11/1976 | Chant | 264/46.4 |
| 4,059,660 | 11/1977 | Roth et al. | 264/46.4 |
| 4,180,631 | 12/1979 | Yukuta et al. | 521/164 |
| 4,196,160 | 4/1980 | Sperry . | |
| 4,228,076 | 10/1980 | Pettingell | 264/321 |
| 4,241,189 | 12/1980 | Sheldon et al. | 521/50 |
| 4,265,965 | 5/1981 | Chancler | 428/141 |
| 4,278,482 | 7/1981 | Poteet et al. | 156/78 |
| 4,304,810 | 12/1981 | Gates et al. | 428/218 |
| 4,389,358 | 6/1983 | Hendry | 264/45.1 |
| 4,443,286 | 4/1984 | Ikeda et al. | 156/245 |
| 4,454,191 | 6/1984 | von Blücher et al. | 428/244 |
| 4,465,388 | 8/1984 | Iswasawa | 400/196.1 |
| 4,508,774 | 4/1985 | Grabhoefer et al. | 428/220 |
| 4,513,518 | 4/1985 | Jalbert et al. | 36/44 |
| 4,515,646 | 5/1985 | Walker et al. | 156/78 |
| 4,591,521 | 5/1986 | Fresno et al. | 428/78 |
| 4,600,461 | 7/1986 | Guy | 156/244.12 |
| 4,656,906 | 4/1987 | Mozieka et al. | 83/451 |
| 4,668,557 | 5/1987 | Lakes | 428/131 |
| 4,674,204 | 6/1987 | Sullivan et al. | 36/44 |
| 4,740,256 | 4/1988 | Vosberg | 156/73.1 |
| 4,781,774 | 11/1988 | Steward et al. | 156/79 |

(List continued on next page.)

FOREIGN PATENT DOCUMENTS

| | | |
|---|---|---|
| 0480456 | 4/1992 | European Pat. Off. . |
| 1302213 | 1/1973 | United Kingdom . |

*Primary Examiner*—Kathleen Choi
*Attorney, Agent, or Firm*—Brooks & Kushman P.C.

[57] ABSTRACT

A formed laminate (20) is made by a method and apparatus (38) by compressing a flexible sheet (28) and a quick reacting foamable liquid mixture (50) that has substantially completed expansion but not yet substantially cured so as to form the flexible sheet and provide a collapsed foam layer (30) bonded to the sheet. The flexible sheet (28) is preferably porous cloth, vinyl or leather. A film (56) which is preferably a nonadherent plastic such as polyethylene is preferably positioned in a vertically spaced relationship with the flexible sheet (28) either above or below the flexible sheet with the foamable liquid mixture received therebetween for the expansion prior to the compression that provides the formed laminate. The formed laminate (20) has particular utility as an article of apparel (22).

8 Claims, 7 Drawing Sheets

U.S. PATENT DOCUMENTS

| | | | |
|---|---|---|---|
| 4,789,584 | 12/1988 | Perrin | 428/159 |
| 4,810,316 | 3/1989 | Wakabayashi et al. | 156/78 |
| 4,816,494 | 3/1989 | Watson, Jr. et al. | 521/137 |
| 4,828,238 | 5/1989 | Mozieka et al. | 269/21 |
| 4,850,579 | 7/1989 | Fisher | 269/21 |
| 4,877,814 | 10/1989 | Ito | 521/79 |
| 4,878,972 | 11/1989 | Kaneko et al. | 156/78 |
| 5,032,622 | 7/1991 | Herrington et al. | 521/99 |
| 5,037,591 | 8/1991 | Rohrlach et al. | 264/46.5 |
| 5,260,345 | 11/1993 | DesMarais et al. | 521/148 |
| 5,296,282 | 3/1994 | Thary . | |
| 5,389,318 | 2/1995 | Thary . | |

THREE-DIMENSIONALLY FORMED LAMINATE

This is a continuation of application U.S. Ser. No. 08/134,278, filed on Oct. 12, 1993 now abandoned, which is a divisional of application U.S. Ser. No. 07/890,530, filed on May 28, 1992, now U.S. Pat. No. 5,296,182, issued on Mar. 22, 1994.

TECHNICAL FIELD

This invention relates to a method and apparatus for making a formed laminate and also relates to the resultant formed laminate made by the method and apparatus.

BACKGROUND ART

Slab stock foam has previously been compressed to provide greater strength such as for carpet padding, to control size of cells such as for use as a filtering media, and to provide localized compressed areas such as for reinforcement for fasteners. Such prior art and other foam prior art noted during investigation conducted for the present invention are disclosed by U.S. Pat. Nos. 3,243,485, Griffen; 3,506,600 Zocco et al.; 3,622,435 Cacella; 3,650,993 Zocco et al.; 3,709,966 Gambardella; 3,867,320 Gambardella et al.; 3,880,977 Gealer et al.; 3,978,266 Lock; 3,978,855 McRae et al.; 4,180,631 Yukuta et al.; 4,228,076 Pettingell; 4,241,189 Sheldon et al.; 4,246,361 Yukuta et al.; 4,265,965, Chancler; 4,278,482, Poteet et al.; 4,304,810 Gates et al.; 4,443,286 Ikeda et al.; 4,465,388 Iwasawa; 4,508,774 Grabhoefer et al.; 4,513,518 Jalbert et al.; 4,515,646 Walker et al.; 4,600,461, Guy; 4,656,906 Mozieka et al.; 4,668,557 Lakes; 4,740,256 Vosberg; 4,781,774, Steward et al.; 4,789,584, Perrin; 4,810,316, Wakabayashi et al.; 4,816,494 Watson, Jr. et al.; 4,828,238 Mozieka et al.; 4,850,579 Fisher; 4,878,972, Kaneko et al.; and 5,032,622 Herrington et al.

Wearing apparel, which is one use for which the present invention has particular utility, often has designs, logos etc. printed, dyed or sewn onto the article which can be a T-shirt, sweater, etc. However, heretofore there has not been any great acceptance of processing for forming wearing appeal with a formed shape that enhances the article of apparel.

DISCLOSURE OF INVENTION

One object of the present invention is to provide an improved method for making a formed laminate.

In carrying out the above object, the method for making a formed laminate in accordance with the invention is performed by positioning a flexible sheet adjacent first and second contoured mold surfaces and providing a quick reacting foamable liquid mixture adjacent the contoured mold surfaces for reaction that causes full expansion in less than 25 seconds to provide a foam which subsequently cures in less than 20 minutes at room temperature without any heating but which, after substantial completion of the expansion and before substantial curing has taken place, has a transitory state when the liquid mixture is viscous and defines cells enclosing gas generated during the expansion stage of the reaction. Relative movement of the first and second mold members toward each other compresses the foam and the flexible sheet between the first and second contoured mold surfaces during the foam reaction while the foam is in the transitory state to form the flexible sheet and provide a collapsed foam layer that is bonded to the flexible sheet as the formed laminate. Performing of this method allows the formed laminate to have a formed flexible sheet that is capable of assuming many configurations without wrinkling due to the manner in which the foam prior to complete curing applies pressure evenly and stretches and compresses the flexible sheet as necessary.

In performing the method for making the formed laminate, the flexible sheet utilized is preferably porous cloth, vinyl or leather. When the flexible sheet is a cloth that is so porous as to be permeable by the foamable liquid mixture, it is also possible to utilize a barrier coating that prevents the foamable liquid mixture from permeating the cloth and hardening the resultant product and/or passing through the cloth so as to be exposed on its exterior surface.

In the preferred practice of the method, a film is positioned in a vertically spaced relationship to the flexible sheet and the foamable liquid mixture is received therebetween for reaction that causes the expansion to provide the foam. In one version of the preferred practice of the method, the film is positioned below the flexible sheet and receives the foamable liquid mixture for reaction and consequent expansion. When this version of the method is utilized with highly porous cloth as the flexible sheet, a barrier coating may be utilized facing downwardly to prevent the foam from permeating the cloth during the reaction as the foam expands upwardly from the film. In another version of the preferred practice of the method, the flexible sheet is positioned below the film and receives the foamable liquid mixture for reaction and consequent expansion. When this latter version of the preferred practice of the method is utilized with highly porous cloth as the flexible sheet, the barrier coating may be provided facing upwardly to prevent the foam from permeating the cloth.

In the preferred practice of the method, a cloth layer is laminated to the foam during the foam compression on the opposite side thereof as the flexible sheet.

Another object of the present invention is to provide improved apparatus for making a formed laminate.

In carrying out the immediately preceding object, the apparatus of the invention includes a mold having first and second mold members respectively having first and second contoured surfaces between which a flexible sheet is received. The apparatus also includes a source for supplying a quick reacting foamable liquid mixture on one side of the flexible sheet for reaction that causes full expansion in less than 25 seconds to provide a foam which subsequently cures in less than 20 minutes at room temperature without any heating but which, after substantial completion of the expansion and before substantial curing has taken place, has a transitory state when the liquid mixture is viscous and defines cells enclosing gas generated during the expansion stage of the reaction. A mold actuator of the apparatus provides relative movement of the first and second mold members toward each other from an initial position where the flexible sheet and foam are received therebetween to a final position while the foam is in its transitory state to form the flexible sheet and provide a collapsed foam layer bonded to the flexible sheet as the formed laminate.

In the preferred construction of the apparatus, the source of foamable liquid mixture provides introduction thereof into the mold for the foaming, and in one embodiment this source is constructed as a sprayer that is capable of distributing the foamable liquid mixture with a minimum thickness over the entire area even when irregular shapes are involved.

In its preferred construction, the apparatus also includes a peripheral mold member that defines an expansion chamber in which the foamable liquid mixture reacts to provide the foam. In one embodiment, the peripheral mold member includes an injection port through which the foamable liquid mixture is introduced into the expansion chamber and the peripheral mold member also includes a vent that allows escape of air and gas generated by the foaming as well as allowing escape of any excess foam.

The preferred construction of the apparatus also includes a clamp means for positioning the flexible sheet and, most preferably, for also positioning a film in a spaced relationship to the flexible sheet to receive the foamable liquid mixture between the flexible sheet and the film. This clamp means subsequently permits movement of the film during the mold member movement as the flexible sheet and foam are formed to provide the formed laminate. With some flexible sheets, the clamp means may also permit movement of the flexible sheet along with the movement of the film during the mold member movement. This clamping is disclosed in one version with both the flexible sheet and the film clamped against the peripheral mold member. In another version, the clamping is with the flexible sheet clamped against the upper mold member and the film clamped against the peripheral mold member at either its lower or upper side. In a further version, the clamping is with the film clamped against the upper mold member and the flexible sheet clamped against the peripheral mold member.

A further object of the invention is to provide an improved formed laminate which includes a flexible sheet and a collapsed foam layer bonded to the flexible sheet and made from a quick reacting foamable liquid mixture that fully expands in less than 25 seconds to provide a foam which subsequently cures in less than 20 minutes at room temperature without any heating but which, after substantial completion of the expansion and before substantial curing has taken place has a transitory state when the liquid mixture is viscous and defines cells enclosing gas generated during the expansion stage of the reaction. The flexible sheet and the collapsed foam layer have oppositely facing surfaces each of which has a three-dimensionally contoured shape that is provided by compressing the flexible sheet and the foam while in its transitory state between first and second contoured mold surfaces which are moved toward each other to collapse the foam as well as provide the contoured shape of both the flexible sheet and the collapsed foam layer.

In the preferred constructions disclosed, the formed laminate has the flexible sheet provided as porous cloth, vinyl or leather. Furthermore, the foam is preferably either a polyurethane foam or a polyurea foam.

In the preferred construction, the formed laminate has oppositely oriented curvatures such that the centers of curvatures are on opposite sides of the laminate.

While various uses are possible, the formed laminate has particular utility as an article of apparel.

The formed laminate is also disclosed as including an inner layer laminated to the foam on the opposite side thereof as the flexible sheet. The flexible sheet and the inner layer have oppositely facing surfaces each of which as well as the foam therebetween has a three-dimensionally contoured shape.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
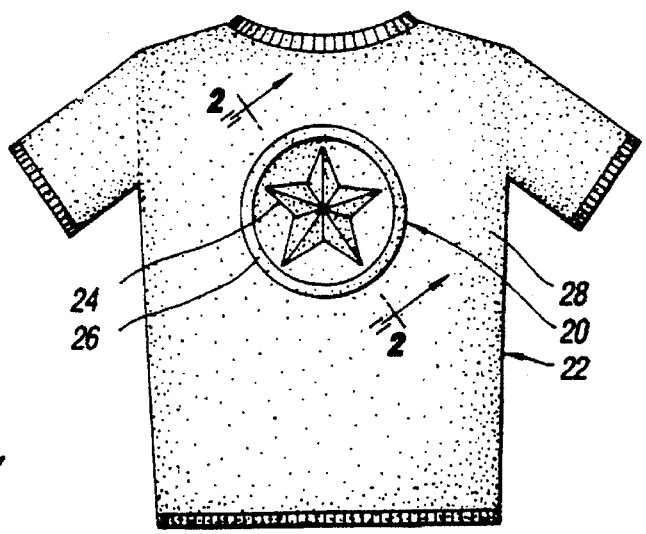
FIG. 1 is a front perspective view of a T-shirt that has been processed by the method and apparatus of the invention to provide a formed laminate having a flexible sheet and a collapsed foam layer.
Figure 2:
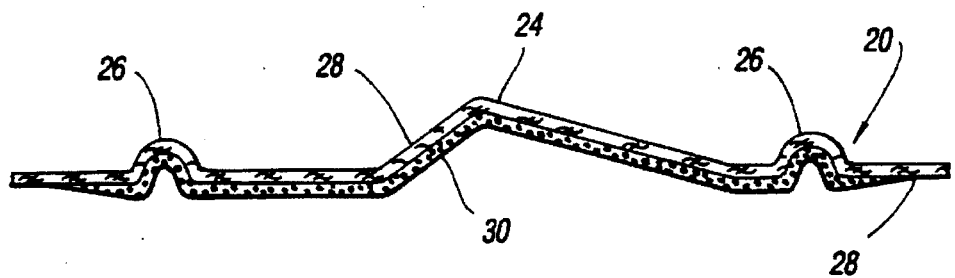
FIG. 2 is a sectional view taken through the formed laminate along the direction of line 2—2 in FIG. 1.

With reference to FIGS. 1 and 2 of the drawings, a formed laminate 20 is constructed in accordance with the present invention and is made by the method and apparatus of the invention as is hereinafter more fully described. The description of the method, apparatus and resultant formed laminate 20 of the invention which follow are integrated with each other to facilitate understanding.

As illustrated in FIG. 1, the formed laminate 20 that is three-dimensionally contoured is shown as part of an article of apparel embodied by a T-shirt 22 and is illustrated as a raised star 24 within a raised circle 26. As shown in FIG. 2, the formed laminate includes a flexible sheet 28 which is embodied by porous cloth of the T-shirt and also includes a collapsed foam layer 30 bonded to the flexible sheet. The flexible sheet 28 and the collapsed foam layer 30 have a contoured shape so as to cooperatively provide the formed laminate which, as described above, includes the raised star 24 within the raised circle 26. This construction of the star within the circle as illustrated provides oppositely oriented curvatures which can be performed without wrinkling of the cloth due to the manner in which the foam and cloth are compressed during forming of the laminate as is hereinafter more fully described.

Figure 3:
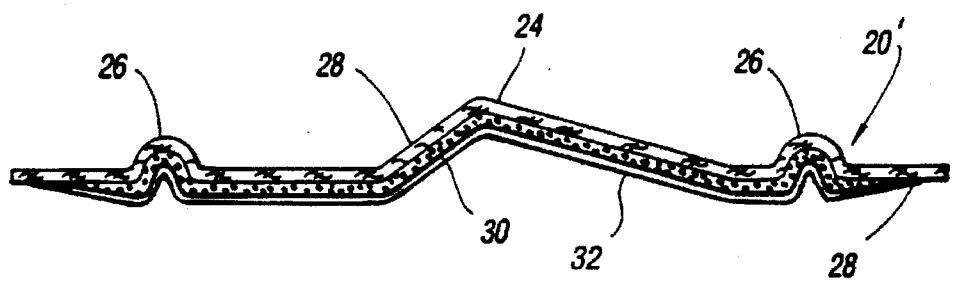
FIG. 3 is a sectional view similar to FIG. 2 but showing the formed laminate with an inner layer that prevents skin contact with the collapsed foam layer of the laminate.

With reference to FIG. 3, the formed laminate 20' is shown in an alternative construction as including an inner layer 32 that prevents skin contact with the compressed foam 30. This inner layer 32 may be a separate cloth layer laminated to the foam during or after the foam compression or, alternatively, may be a flocking applied after the foam compression. The flexible sheet 28 and the inner layer 32 have oppositely facing surfaces each of which as well as the foam therebetween has a three-dimensionally contoured shape.

Figures 4, 5, 6:
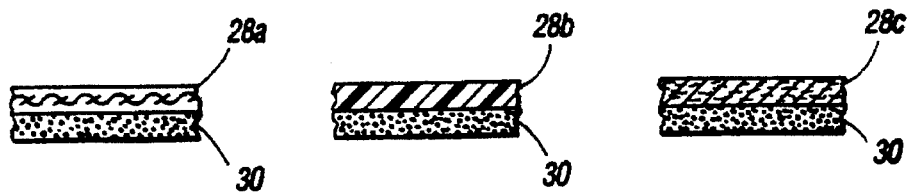
FIG. 4 is a partial sectional view that illustrates a portion of the formed laminate wherein a flexible sheet thereof is constructed as cloth to which the collapsed foam is bonded.
FIG. 5 is a view similar to FIG. 4 of another embodiment wherein the flexible sheet to which the collapsed foam is bonded is vinyl.
FIG. 6 is a view of a further embodiment wherein the flexible sheet to which the collapsed foam is bonded is leather.

The flexible sheet of the formed laminate may have different constructions as illustrated by FIGS. 4 through 6. More specifically, the flexible sheet as discussed above may be embodied by porous cloth 28a as shown in FIG. 4, vinyl 28b as shown in FIG. 5, or leather 28c as shown in FIG. 6. In each instance, the collapsed foam layer 30 is bonded to the associated cloth 28a, vinyl 28b, or leather 28c and formed to the desired shape of the laminate for whatever use is required. While different types of foam may be utilized to provide the collapsed foam, best results are achieved with the use of polyurethane foam or polyurea foam to provide the collapsed foam layer as is hereinafter more fully described. Specific examples of polyurethane foam formulations are hereinafter specified. Polyurea foam compositions such as sold by Texaco Chemical Company of Houston, Tex., United States of America under the trademark PUREA can be directly molded against cloth without penetrating the cloth such that no barrier is normally necessary. Furthermore, as in hereinafter more fully described, the invention has particular utility when used with foamable liquid mixtures of the quick reacting type.

Figure 7:
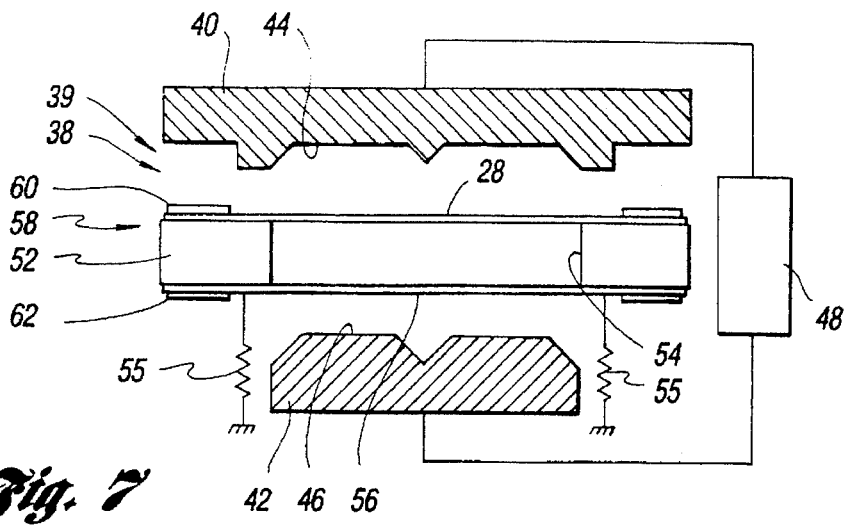
FIG. 7 is a schematic sectional view of apparatus constructed in accordance with the invention to perform the method thereof for making a formed laminate in accordance with the invention.

With reference to FIG. 7 of the drawings, the method for making the formed laminate in accordance with the present invention is performed by apparatus 38 that is constructed in accordance with the invention and includes a mold 39 having a pair of upper and lower mold members 40 and 42. These mold members 40 and 42 have respective three-dimensionally contoured mold surfaces 44 and 46 between which the flexible sheet 28 is received. The contoured mold surfaces 44 and 46 are normally generally complementary to each other to provide a generally uniform thickness of the collapsed foam layer 30. However, for some applications, it may be desirable for the collapsed foam layer to have different thicknesses in selected areas and the mold surfaces will then be configured accordingly.

Figure 23:
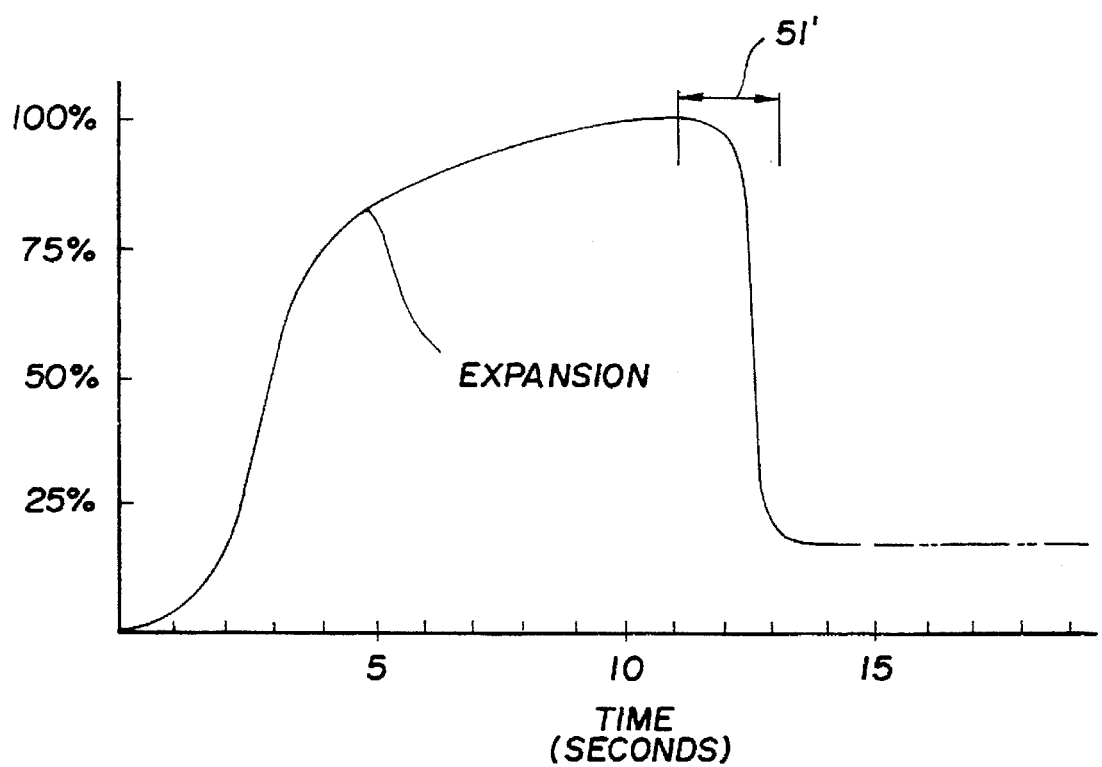
FIG. 23 is a view that illustrates the expansion of the foam as the processing is performed.
Figure 24:
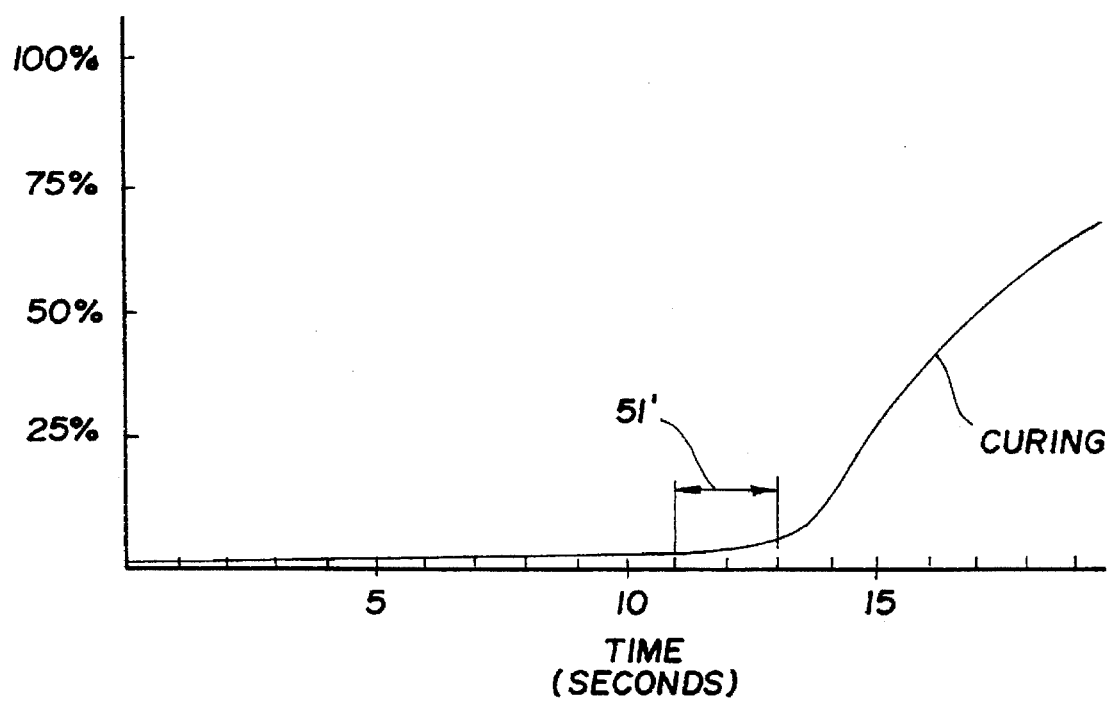
FIG. 24 is a view that illustrates the rate of curing as the processing is performed.

A schematically indicated actuator 48 provides a means for moving the mold members 40 and 42 during the manufacturing of the formed laminate. More specifically, the actuator 48 moves the mold members from the initial position shown in FIG. 7 after first having received a foamable liquid mixture 50 with the flexible sheet positioned as illustrated by the different constructions of FIGS. 8 through 14. The mold 39 as shown in FIG. 15 receives the foamable liquid mixture 50 which is of the quick reaction type that fully expands in less than 25 seconds and preferably in less than 15 seconds on one side of the flexible sheet to provide an expanded foam 51 (FIG. 16) which subsequently cures but which, after substantial completion of the expansion as shown in FIG. 23 and before substantial curing has taken place as shown in FIG. 24, has a transitory state 51' when the liquid mixture is viscous and defines cells enclosing gas generated during the expansion stage of the reaction. Actuator 48 is then operated to provide relative movement of the mold members 40 and 42 toward each other as illustrated by arrows 52 in FIG. 16. This relative movement may be provided by downward movement of the upper mold member 40, upward movement of the lower mold member 42, or combined downward movement of the upper mold member 40 and upward movement of the lower mold member 42. Thus, the relative movement of the mold members 40 and 42 to the position of FIG. 17 while the foam is in the transitory state forms the flexible sheet 28 and collapses the foam layer 30 which is also formed to the same shape as the flexible sheet as well as being bonded thereto to cooperatively provide the formed laminate. The compression of the foam should not be performed until substantially all of the expansion, i.e. 90% and most preferably 95%, has taken place so that the force that compresses and collapses the foam and forms the laminate does not have to counteract the expansion as the gas is generated. However, the compression of the foam has to be performed before substantial curing has taken place so that the foam is still fragile, i.e. the cellular walls in which the gas is located must be still viscous such that the larger gas bubbles burst even though the smaller ones do not due to the surface tension of the cellular walls. The extent of the foam collapse is somewhat localized such that the compression must be performed over the entire extent of the formed laminate.

As illustrated in FIG. 7, the apparatus 38 has the mold 39 with its mold members 40 and 42 spaced from each other to facilitate introduction of the foamable liquid mixture into the mold. Such introduction is most conveniently performed by the preferred construction of the mold which includes a peripheral mold member 52 that defines an expansion chamber 54 in which the foamable liquid mixture reacts to provide the foam as previously described in connection with FIGS. 15 through 17. This peripheral mold member 52 is preferably biased upwardly by springs 55 and has its expansion chamber 54 configured so that it can receive the lower mold member 42. Spacing of the upper and lower mold members 40 and 42 in the FIG. 7 position facilitates introduction of the foamable liquid mixture into the mold 39.

Figure 8:
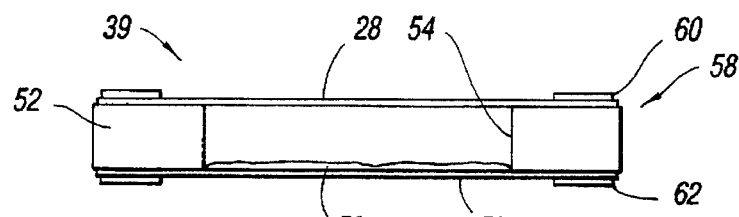
FIG. 8 is a partial sectional view which illustrates one constructional embodiment of the apparatus wherein a film is positioned below the flexible sheet to receive a foamable liquid mixture for expansion.
Figure 9:
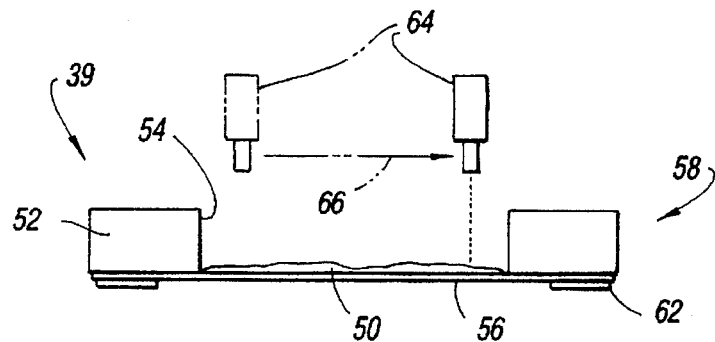
FIG. 9 is a view that schematically illustrates one manner in which a foamable liquid mixture may be deposited within a mold of the apparatus such as by a dispensing machine.
Figure 10:
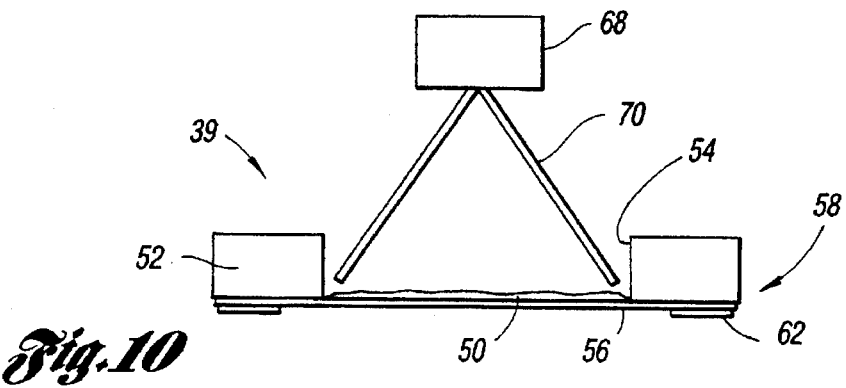
FIG. 10 is a view similar to FIG. 9 illustrating a further embodiment wherein the foamable liquid mixture is deposited within the mold by a sprayer.

Different ways in which the foamable liquid mixture 50 is introduced into the mold are illustrated by FIGS. 8 through 14 which show the peripheral mold member 52 as well as a film 56 which is preferably an nonadherent plastic such as polyethylene. As shown in FIG. 8, the film 56 is located below the flexible sheet 28. A schematically indicated clamp 58 includes upper and lower clamp members 60 and 62 that respectively provide clamping of the flexible sheet 28 and the film 56. This clamping positions the flexible sheet 28 and the film 56 in a vertically spaced relationship to each other so that the foamable liquid mixture 50 can be received therebetween. Specifically, the foamable liquid mixture 50 is received by the film 56 as shown with the film clamped below the flexible sheet 28. More specifically, the foamable liquid mixture 50 is introduced from a suitable source in a suitable manner such as by pouring from a dispenser 64 as shown in FIG. 9 with the dispenser being moved as illustrated by arrow 66 from the phantom line position to the solid line position so as to distribute the foamable liquid mixture. It is also possible as shown in FIG. 10 for the foamable liquid mixture 50 to be distributed by a sprayer such as schematically indicated at 68 and, in this practice, it is preferable to utilize a shield 70 that directs the spray.

Figure 11:
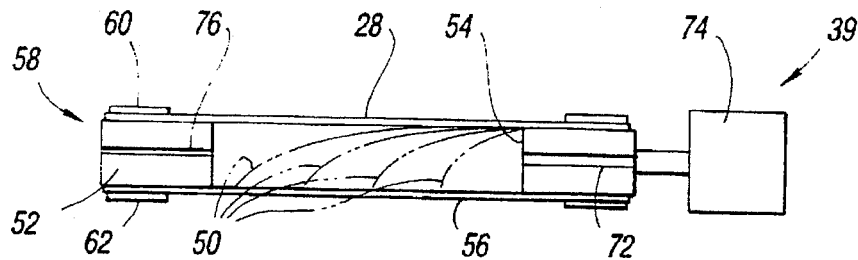
FIG. 11 is a view of a further embodiment wherein the foamable liquid mixture is provided into the mold by an injector.

As illustrated in FIG. 11, the peripheral mold member 52 may also include an injection port 72 through which an injector 74 introduces the foamable liquid mixture 50 into the expansion chamber 54 with the foaming taking place from the right toward the left as shown by the profile lines identifying the surface of the mixture. The peripheral mold 52 in this instance also includes a vent 76 through which air and gas generated during the foam reaction can escape as well as any excess foam. As required, there may also be a plurality of the injection ports 74 as well as a plurality of the vents 76 which will depend upon the particular configuration of the expansion chamber being filled with the foam.

When the foamable liquid mixture is introduced into the mold by injection as shown in FIG. 11, the expanded foam layer should have a minimum thickness that depends upon shape as well as surface area with a greater thickness necessary for larger areas and more irregular shapes. For example, an area of approximately 20 cm.×20 cm. should have a minimum expanded foam thickness of about 15 mm. while a surface of about 50 cm.×50 cm. should have a minimum expanded foam thickness of about 30 mm. However, much thinner foam layers can be achieved when the foamable liquid mixture is introduced by a dispenser as shown in FIG. 9 or a sprayer as shown in FIG. 10.

Figure 12:
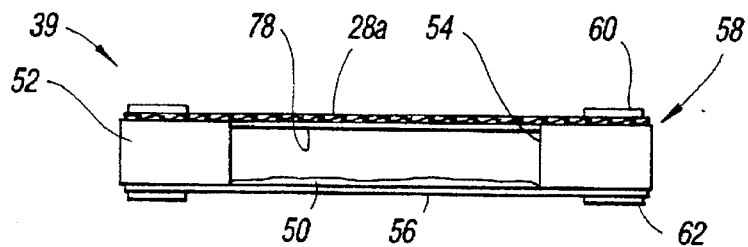
FIG. 12 is a view similar to FIGS. 8 through 11 wherein the flexible sheet is a highly porous cloth that is clamped above a lower film and has a barrier coating to prevent the foam from permeating the cloth.

With reference to FIG. 12, when there is a highly porous cloth flexible sheet 28a, it is desirable to coat the cloth with a barrier coating 78 so as to prevent the foam mixture from permeating the cloth and hardening the cloth fibers or passing through the cloth to its outer exposed surface. The barrier coating 78 is on the lower cloth surface facing downwardly when the flexible cloth sheet 28a is in the upper position above the film 56. Furthermore, while any operable barrier coating may be used, one preferred barrier coating 78 is a latex foam with an average thickness in the range of about 0.025 to 1.0 millimeter and an open cell structure with about 400 to 600 cells or openings per square millimeter.

These parameters will allow the barrier coating 78 to be breathable while still having the capability of preventing the foamable liquid mixture 50 from permeating the cloth. The composition of the latex foam barrier coating includes an acrylic copolymer, a ph neutralizer, a stiffener, water and a latex premix as well as a frothing agent and aerosol. Furthermore, the ratio by weight of the frothing agent over the aerosol should be in the range of about 2.3 to 2.85 and most preferably about 2.58. The frothing agent is a surfactant that reduces the surface tension so that air is more easily entrained in the latex foam mixture by mixing while the aerosol is a weaker surfactant that causes the larger air cells to break into smaller ones and thereby provides air cells of a more uniform size as well as providing greater stability so that the latex foam barrier coating can be spread or pumped if necessary. It is important for the ratio of the frothing agent and the aerosol to be in the range described above so as to ensure sufficient frothing without having so much aerosol that the mixture collapses upon foaming. A specific example of the latex foam barrier coating is set forth by the following example.

| COATING EXAMPLE | |
| --- | --- |
| Components | Parts by Weight |
| *Rhoplex E-1011 (acrylic copolymer 30% solid, and H$_2$O) | 200.00 |
| Water | 58.3 |
| Premix | |
| *Tamol 731 (25%) (emulsifier aid) | 4.4 |
| TiO2 (white pigment) | 5.0 |
| **Acme WW (calcium carbonate filler) | 55.0 |
| *Acrysol ASE-95 (stiffener) | 0.7 |
| ***Stanfax 320 (an ammonium stearate frothing agent that is 32% solid) | 7.5 |
| ****Octosol A-18 (aerosol 34% solid, and H$_2$O) | 2.9 |
| NH4NO3 (25%) (PH Neutralizer) | 2.5 |

*Trademark of the Rohm and Haas Company of Philadelphia, Pennsylvania, United States of America
**Trademark of the ECC American, Inc. of Sandersville, Georgia, United States of America
***Trademark of Standard Adhesive & Chemical Company of Dalton, Georgia, United States of America
****Trademark of Textile Rubber and Chemical Co. of Dalton, Georgia, United States of America It should be noted that the calcium carbonate filler is merely utilized to provide the barrier coating 78 more volume and thus cost reduction. This filler is a clay powder that is dispersed in the mixture during mixing and can also be provided as a premixed aqueous dispersion which is sold by the previous mentioned ECC American, Inc. of Sandersville, Ga. under the trademark Eccatex 90 and is 68% solids. Also, the latex foam barrier coating mixture of this example has a viscosity of about 940 centipoises when measured by Brookfield Viscosity, Low Viscosity Formula, Mixer Paddle #3, at 30 revolutions per minute. The density of the resultant latex foam is on the order of about 0.15 grams per cubic centimeter when air is introduced by mixing from the atmosphere. Introduction of pressurized air into a closed chamber where the mixing is performed provides a greater porosity and hence a lower density such as about 0.12 grams per cubic centimeter.

Figure 13:
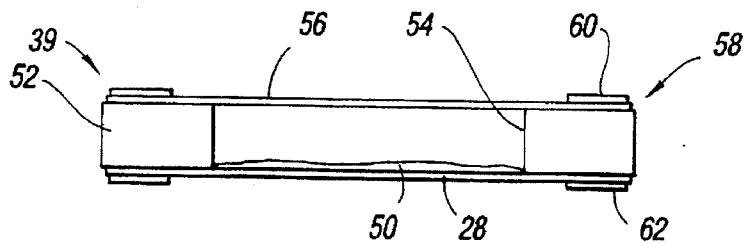
FIG. 13 is a view similar to FIGS. 8 through 12 but illustrates the flexible sheet positioned below the film instead of above the film.

With reference to FIG. 13, it is also possible for the flexible sheet 28 to be positioned below the film 56 and to receive the foamable liquid mixture 50 with the film 56 limiting upward expansion so as to ensure that the foam thickness is generally uniform in preparation for the subsequent compression as previously described, assuming that such thickness uniformity is desired for the particular formed laminate being manufactured.

Figure 14:
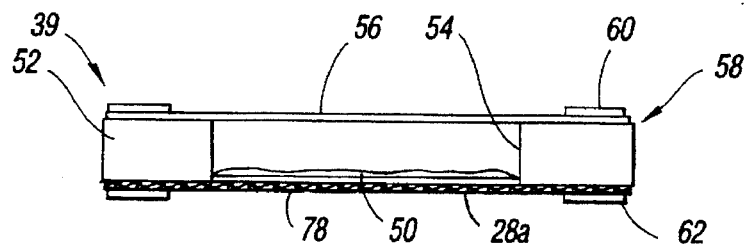
FIG. 14 is a view similar to FIG. 13 wherein the flexible sheet is a porous cloth that is positioned below the film and has a barrier coating for preventing the foam from permeating the cloth.
Figure 15:
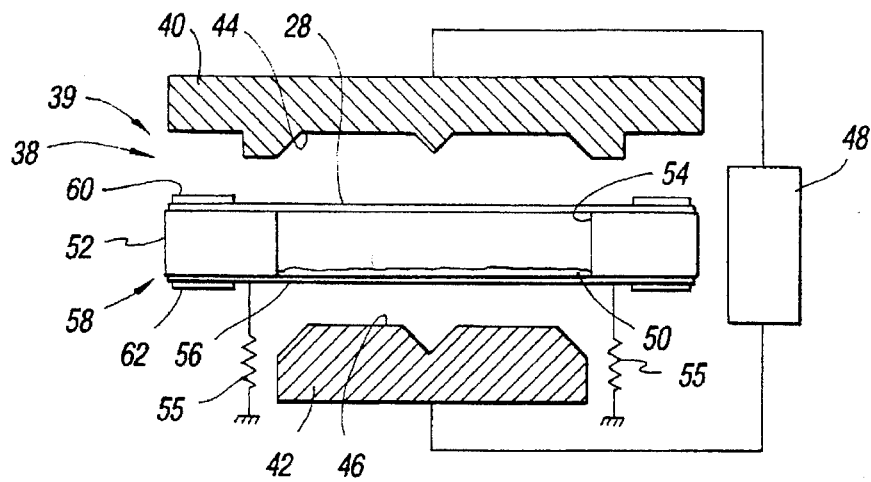
FIG. 15 is a view of the apparatus that is similar to FIG. 7 but illustrates the foamable liquid mixture within the mold at the commencement of the processing cycle.

When a porous cloth flexible sheet 28a is utilized at the lower position with the upper film 56 as shown in FIG. 14, the barrier coating 78 as previously described is provided to the cloth facing upwardly so as to prevent the foamable liquid mixture from permeating the cloth. In this embodiment, this cloth permeation is a greater problem then in the embodiment of FIG. 12 since the foamable liquid mixture 50 initially contacts the cloth upon being deposited within the mold and is thus less viscous and more likely to permeate the cloth layer 28a.

Figure 16:
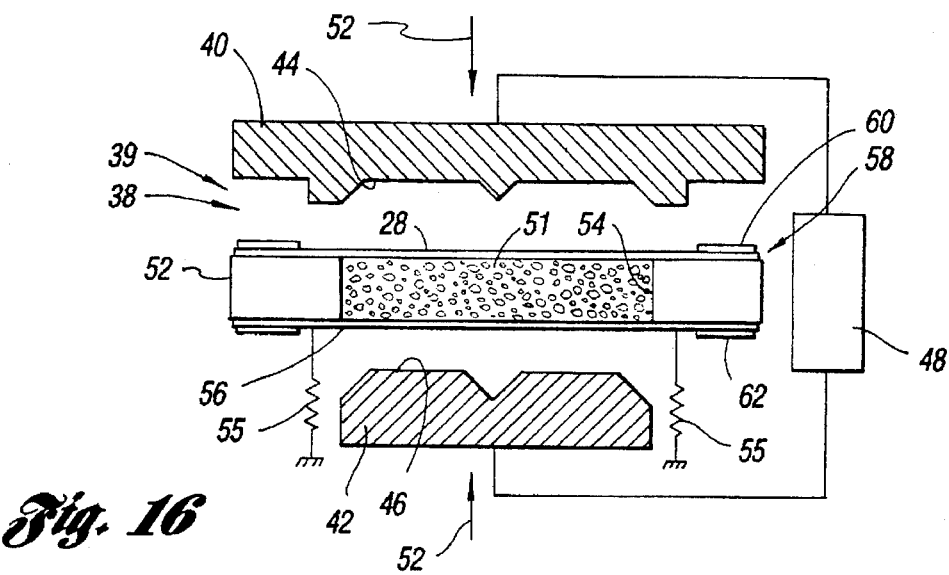
FIG. 16 is a view of the apparatus similar to FIG. 15 but after the foam has reacted and expanded but prior to any substantial curing.
Figure 17:
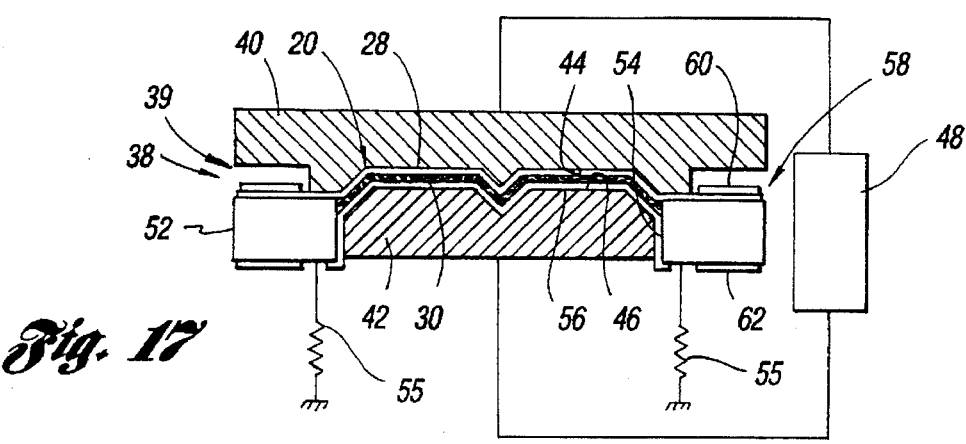
FIG. 17 is a view at the end of the processing cycle after relative movement of the mold members of the apparatus toward each other has formed the flexible sheet and collapsed the foam to provide the formed laminate.

With reference to FIGS. 15 through 17, the foamable liquid mixture will expand on the order of about 20 times upon forming the foam prior to the compression under the operation of the mold actuator 48. After the compression, the collapsed foam layer 30 will have a thickness in the range of about 1/7 to 1/5 of its expanded thickness and normally about 1/6 of its expanded thickness which is thus about three or four times or so the original volume of the foamable liquid mixture. The collapsed foam thus is about 2/3 to 3/4 by volume of gas and the remainder reacted polymer, as opposed to 95% gas and the remainder polymer for normal foams. The collapsed foam will thus have a density in the range of about 0.25 to 0.33 and most normally about 0.30 of the density of water.

Figure 18:
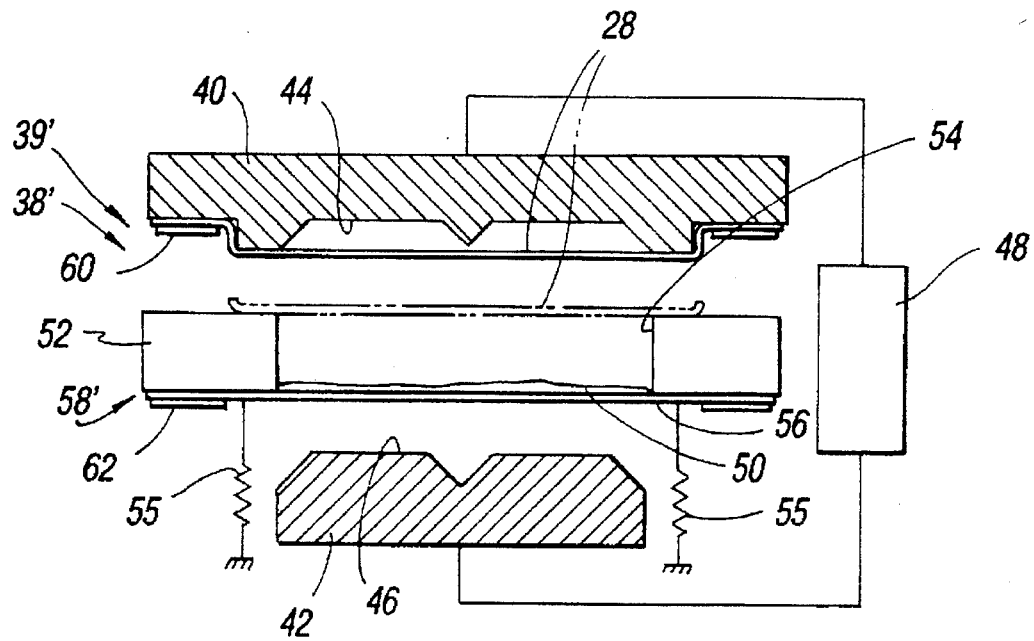
FIG. 18 is a view of another modification of the apparatus wherein the flexible sheet is clamped to an upper mold member of the mold and the film is clamped to a peripheral mold member of the mold at a lower side thereof.

As illustrated in FIG. 18, another embodiment of the apparatus 38' is similar to the embodiment shown in FIGS. 7 and 15–17 except that its mold 39' has the clamp 58' provided with the upper clamp member 60 clamping the flexible sheet 28 against the upper mold member 40 instead of against the upper side of the peripheral mold member 52. The lower clamp member 62 clamps the film 56 against the lower side of the peripheral mold member 52 so as to receive the foamable liquid mixture 50. Downward movement of the upper mold member 40 positions the flexible sheet 28 as shown by phantom line representation so as to restrict the upward rise of the foam as previously described with the flexible sheet, the film and the peripheral mold member cooperating to confine the expanding foam. Relative movement of the upper and lower mold members 40 and 42 toward each other as previously described in connection with FIG. 17 while the foam has completed substantially all of its expansion but prior to any substantial curing forms the flexible sheet and provides a collapsed foam layer bonded to the flexible sheet as the formed laminate in the same manner as previously described. This construction facilitates the initial introduction of the foamable liquid mixture 50 into the mold while still permitting the mold closure for the expansion and forming within the relatively short time available before the foam begins to cure.

Figure 19:
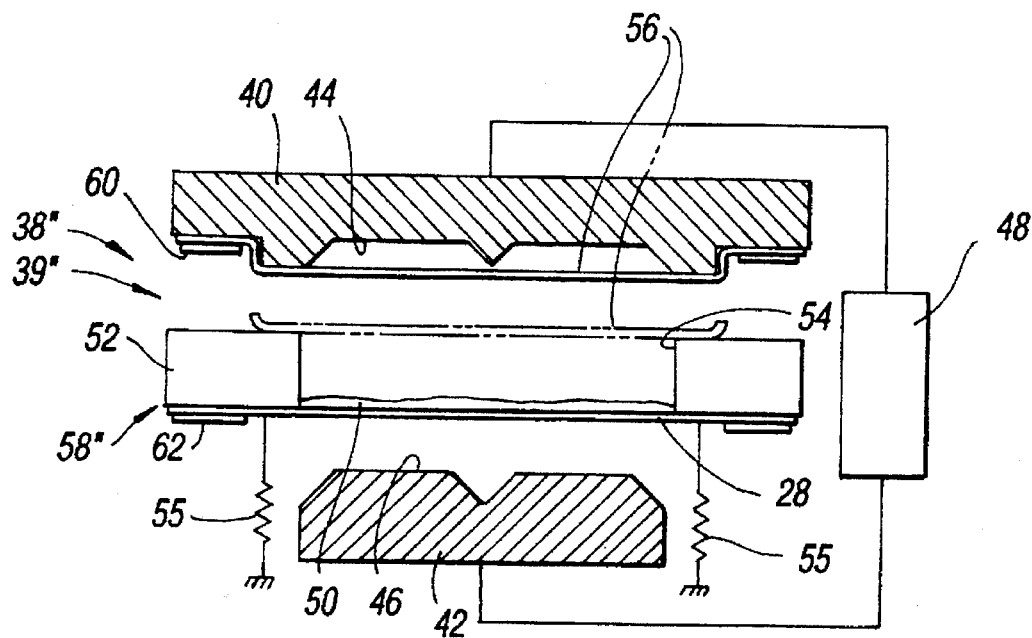
FIG. 19 is a view of a further modification of the apparatus wherein the film is clamped to the upper mold member and the flexible sheet is clamped to the peripheral mold member.

With reference to FIG. 19, a further embodiment of the apparatus 38" is similar to the previously described embodiments except that its mold 39" has the clamp 58" constructed so that its upper clamp member 60 provides clamping of the film 56 against the upper mold member 40 and so the lower clamp member 62 provides clamping of the flexible sheet 28 against the lower side of the peripheral mold member 52. After the introduction of the foamable liquid mixture 50 into the expansion chamber 54, the upper mold member 40 is moved downwardly so that the film 56 moves to the phantom line indicated position to restrict the foam expansion. Subsequent movement of the mold members 40 and 42 toward each other forms the flexible sheet 28 and provides a collapsed foam layer bonded to the flexible sheet as the formed laminate in the same manner previously described.

Figure 20:
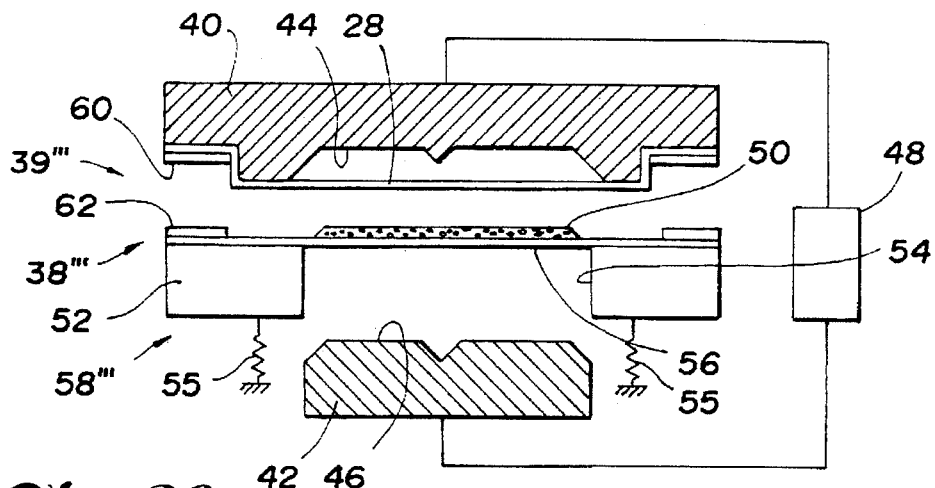
FIG. 20 is a view of a further modification of the apparatus similar to the embodiment of FIG. 18 but with the film clamped at the upper side of the peripheral mold member of the mold instead of at its lower side.
Figure 21:
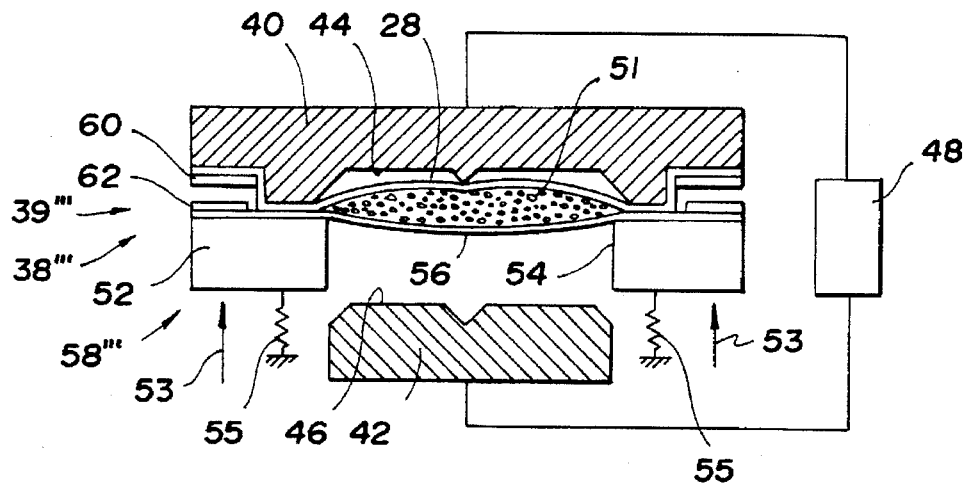
FIG. 21 is another view of the apparatus of FIG. 20 at a further stage after the upper mold member and peripheral mold member have been moved toward each other.
Figure 22:
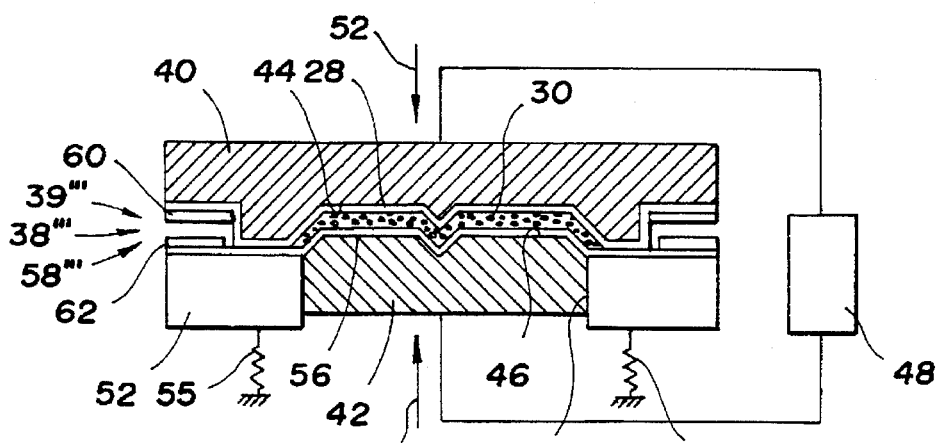
FIG. 22 is another view of the apparatus in FIG. 20 at a still further stage than FIG. 21 after the lower and upper mold members have been moved toward each other to provide the formed laminate.

With reference to FIG. 20, another embodiment of the apparatus 38''' is similar to the embodiment of FIG. 18 except that the lower clamp 62 clamps the film against the upper side of the peripheral mold member 52 where the film receives the foamable liquid mixture 50 instead of at the lower side of the peripheral mold member as with the FIG. 18 embodiment. The upper clamp 60 clamps the flexible sheet 28 against the upper mold 40 across the extent of the contoured surface 44 of the upper mold member. Initial processing of this apparatus begins as the foamable liquid mixture begins to foam to its transitory expanded state 51 shown in FIG. 21 and the upper mold member 40 and the peripheral mold member 52 are moved into engagement by relative vertical movement therebetween such as by movement of the peripheral mold member upwardly as shown by arrows 53. This movement thus clamps the expanded foam 51 between the flexible sheet 28 at its upper side and the film 56 at its lower side. Thereafter, relative movement between the upper mold member 40 and the lower mold member 42 toward each other such as shown by arrows 52 in FIG. 22 moves the lower mold member 42 into the expansion chamber 54 where the expanded foam 51 is compressed before any substantial curing thereof takes place as previously described to thereby collapse the foam into the collapsed foam layer 30 as well as forming the flexible sheet 28 in order to provide the formed laminate 20. Movement of the upper and lower mold members 40 and 42 away from each other as well as movement of the peripheral mold member 52 away from the upper mold member then allows removal of the formed laminate 20.

It should be noted that during the compression of the foam, the clamp 58, 58', 58" or 58''' will normally have its clamp member 60 or 62 that positions the flexible sheet 28 maintaining that positioning so that the pressure of the foam can stretch or compress the flexible sheet to remove any wrinkling in the formed configuration of the laminate. However, the film 56 most advantageously is allowed by the clamp member 60 or 62 to slide so that it can assume the shape of the associated surface that presses against the film. This sliding of the clamped film 56 can be provided by magnetic securement of the associated clamp member to the associated mold member. Furthermore, as previously mentioned, the film is most advantageously an nonadherent plastic such as polyethylene so that it can be removed after forming of the laminate simply by peeling away from the opposite surface of the collapsed foam as the surface bonded to the formed flexible sheet.

As previously discussed, the compression of the foam is performed after substantially all of the expansion has taken place such that the compression is not counteracted by the gas generation during the reaction of the foam. Normally for quick reaction foams this completion of the expansion, or rise as it is also described, will take place in about 8 to 25 seconds, most preferably in the range of 10 to 15 seconds, and complete curing takes place in about 10 to 20 minutes. To perform the foam compression, testing has shown that a relatively low pressure such as about 0.25 to 0.30 Kg/cm$^2$ can be used. Actually, it is believed that the expanded foam upon being initially engaged immediately begins to collapse due to the force applied overcoming the surface tension of the cell walls defined by the still viscous polymer as the first cell wall is thus initially fractured to provide a nucleous for the collapse. The compression forces the gas out of the collapsing foam and further breaks the cell walls. However, the cells which are sufficiently small have a greater wall strength and do not break such that the resultant collapsed foam, as previously mentioned is about 2/3 to 3/4 by volume gas and the remainder polymer. As the gas is forced out, the heat and pressure of the gas are also removed so that there is minimal shrinkage of the collapsed foam. It should also be mentioned that the entire process is performed at room temperature without the need for any heating. Furthermore, the resultant foam product after the compression and subsequent to curing may have hardnesses ranging from soft rubber to hard wood depending upon the specific foam utilized.

The formulations of two foamable liquid mixtures used to provide soft and hard compressed foam layers bonded to associated flexible sheets are set forth by the following examples.

SOFT FOAM FORMULATION EXAMPLE

| Component | Parts by Weight |
| --- | --- |
| *Polyether Daltocel polyol F-2805 | 100.00 |
| Water | 3.20 |
| **Dabco 33 LV Catalyst | 2.10 |
| ***Triethanolamine Catalyst | 6.00 |
| ****Niax A-1 Catalyst | 1.40 |
| *****Silicone Surfactant B-4113 | .30 |
| ******Flexible Cells Opener B-14 | 3.00 |
| *******Isocyanate MDI Rubiflex 27 A | 76.00 to 88 |

*Trademark of ICI Polyurethanes Group of Sterling Heights, Michigan, United States of America
**Trademark of Air Products and Chemical, Inc. of Allentown Pennsylvania, United States of America
***Trademark of Texaco Chemical Company of Houston, Texas, United States of America
****Trademark of Air Products and Chemical, Inc.
*****Trademark of Goldschmidt Chemical Corp. Of Hopwell, Virginia, United States of America
******Trademark of ICI Polyurethanes Group
*******Trademark of ICI Polyurethanes Group

HARD FOAM FORMULATION EXAMPLE

| Component | Parts by Weight |
| --- | --- |
| *Polyether Daltocel polyol F-2805 | 100.00 |
| Water | 3.00 |
| **Dabco 33 LV Catalyst | 1.20 |
| ***Dimethylcyclohexylamine Catalyst | 0.40 |
| ****Monoethyleneglycol Hardener Catalyst | 11.00 |
| *****Isocyanate MDI Rubiflex 27 A | 128.00 to 134.00 |

*Trademark of ICI Polyurethanes Group
**Trademark of Air Products and Chemical, Inc.
***Trademark of Air Products and Chemical, Inc.
****Trademark of Texaco Chemical Company
*****Trademark of ICI Polyurethanes Group It should also be mentioned that testing has shown that the foam compression can be performed with impervious vinyl and generally impervious leather while still permitting escape of the gas generated by the foaming. It is believed that this gas escape results through lateral passage of the gas through the foam layer as the cell walls defined by the still viscous liquid mixture break, and that this gas passage may be at one or both of the interfaces with the impervious flexible sheet and the film as well as through the interior of the foam.

Testing has also shown that when quick reaction foam is used, the formed laminate can be removed from the mold for handling immediately after collapse of the foam. As such, a total cycle time of about 15 seconds can be achieved when the foam utilized has a rise time of about 12 seconds. Complete curing of the formed laminate using such a foam would be on the order of about 15 minutes. This same foam when molded without the compression would require approximately 20 seconds before it could be removed from the mold for handling. Thus, the compression of the foam reduces the cycle time as well as providing the other advantages discussed above.

While the best modes for carrying out the invention have been described in detail, those familiar with the art to which this invention relates will recognize various alternative modes for practicing the invention as defined by the following claims.

What is claimed is:

1. A three-dimensionally formed laminate comprising: a flexible sheet; a collapsed foam layer bonded to the flexible sheet and composed of gas and polymer; the collapsed foam layer being about ⅔ to ¾ by volume of gas and having a density in the range of 0.25 to 0.33 of the density of water; the collapsed foam layer being made from a quick reacting foamable liquid mixture that fully expands in less than 25 seconds to provide a foam which subsequently cures in less than 20 minutes at room temperature without any heating but which, after substantial completion of the expansion and before substantial curing has taken place, has a transitory state when the liquid mixture is viscous and defines cells enclosing gas generated during the expansion stage of the reaction; and the flexible sheet and the collapsed foam layer having oppositely facing surfaces each of which has a three-dimensionally contoured shape that is provided by compressing the flexible sheet and the foam while in its transitory state between first and second three-dimensionally contoured mold surfaces which are moved toward each other to collapse the foam as well as provide the contoured shape of both the flexible sheet and the collapsed foam layer.

2. A formed laminate as in claim 1 wherein the flexible sheet is selected from the group consisting of porous cloth, vinyl and leather.

3. A formed laminate as in claim 1 wherein the foam is selected from the group consisting of polyurethane foam and polyurea foam.

4. A formed laminate as in claim 1 which has oppositely oriented curvatures whose centers of curvature are on opposite sides of the laminate.

5. A formed laminate as in any one of claims 1 through 4, which comprises an article of apparel.

6. A three-dimensionally formed laminate comprising: an article of apparel including a flexible sheet selected from the group consisting of porous cloth, vinyl and leather; a collapsed foam layer bonded to the flexible sheet and composed of gas and a polymer; the polymer being selected from the group consisting of polyurethane foam and polyurea foam; the collapsed foam layer being about ⅔ to ¾ by volume of gas and having a density in the range of 0.25 to 0.33 of the density of water; the collapsed foam layer being made from a quick reacting foamable liquid mixture that fully expands in less than 25 seconds to provide a foam which subsequently cures in less than 20 minutes at room temperature without any heating but which, after substantial completion of the expansion and before substantial curing has taken place, has a transitory state when the liquid mixture is viscous and defines cells enclosing gas generated during the expansion stage of the reaction; and the flexible sheet and collapsed foam layer having oppositely facing surfaces each of which has a three-dimensionally contoured shape that is provided by compressing the flexible sheet and the foam while in its transitory state between first and second three-dimensionally contoured mold surfaces which are moved toward each other to collapse the foam as well as provide the contoured shape of both the flexible sheet and the collapsed foam layer.

7. A formed laminate as in claim 1 further including an inner layer laminated to the foam with the foam located between the inner layer and the flexible sheet.

8. A three-dimensionally formed laminate comprising: an article of apparel including a flexible sheet selected from the group consisting of porous cloth, vinyl and leather; a collapsed foam layer bonded to the flexible sheet and composed of gas and a polymer; the polymer being selected from the group consisting of polyurethane foam and polyurea foam; the collapsed foam layer being composed of about $2/3$ to $3/4$ by volume of gas and having a density in the range of 0.25 to 0.33 of the density of water; the collapsed foam layer being made from a quick reacting foamable liquid mixture that fully expands in less than 25 seconds to provide a foam which subsequently cures in less than 20 minutes at room temperature without any heating but which, after substantial completion of the expansion and before substantial curing has taken place, has a transitory state when the liquid mixture is viscous and defines cells enclosing gas generated during the expansion stage of the reaction; an inner layer located on the opposite side of the collapsed foam layer from the flexible sheet and laminated to the collapsed foam layer; and the flexible sheet and the inner layer having oppositely facing surfaces each of which as well as the collapsed foam layer therebetween has a three-dimensionally contoured shape that is provided by compressing the flexible sheet and the inner layer, with the foam therebetween while the foam is in its transitory state, between first and second contoured mold surfaces which are moved toward each other to collapse the foam as well as provide the contoured shape of the flexible sheet, the inner layer and the collapsed foam layer.

* * * * *

UNITED STATES PATENT AND TRADEMARK OFFICE
CERTIFICATE OF CORRECTION

PATENT NO. : 5,641,564
DATED : June 24, 1997
INVENTOR(S) : CHRISTIAN THARY

It is certified that error appears in the above-identified patent and that said Letters Patent is hereby corrected as shown below:

Column 12, Line 39, Claim 5: after "4" insert --and 7--.

Signed and Sealed this

Ninth Day of March, 1999

Attest:

Q. TODD DICKINSON

*Attesting Officer*   Acting Commissioner of Patents and Trademarks